United States Patent [19]

van der Hoorn et al.

[11] Patent Number: 4,841,602
[45] Date of Patent: Jun. 27, 1989

[54] DEVICE FOR CUTTING UP MEAT AND/OR BONES OF A SLAUGHTER ANIMAL

[75] Inventors: Rudolf J. G. A. van der Hoorn; Marcelles Douwes, both of Nuenen, Netherlands

[73] Assignee: Nederlandse Centrale Organisatie voor Toegepast Natuurwetenschappelijk Onderzoek, The Hauge, Netherlands

[21] Appl. No.: 92,367

[22] Filed: Sep. 2, 1987

[30] Foreign Application Priority Data

Sep. 2, 1986 [NL] Netherlands ........................ 8602220

[51] Int. Cl.$^4$ ............................................... A22B 5/20
[52] U.S. Cl. .......................................... 17/23; 83/639
[58] Field of Search ............... 17/23, 56; 83/639, 607, 83/608, 694

[56] References Cited

U.S. PATENT DOCUMENTS

| 768,236 | 8/1904 | Pratt | 17/23 |
| 2,237,203 | 4/1941 | Swanson | 17/23 X |
| 3,052,914 | 9/1962 | Luedtke | 17/56 |
| 3,402,426 | 9/1968 | Wexel | 17/23 |
| 4,667,368 | 5/1987 | Menqi | 17/23 |

Primary Examiner—Willis Little
Attorney, Agent, or Firm—J. Gibson Semmes

[57] ABSTRACT

Device for cutting up meat and/or bones of a slaughter animal, with a cutting element (120) provided with a cutting edge and a counter support (124) which is situated opposite the cutting edge of said cutting element (120) and comprises an oblong, central, recessed space (126) for receiving the cutting edge, and is provided with symmetrical bearing faces alongside this space.

4 Claims, 7 Drawing Sheets

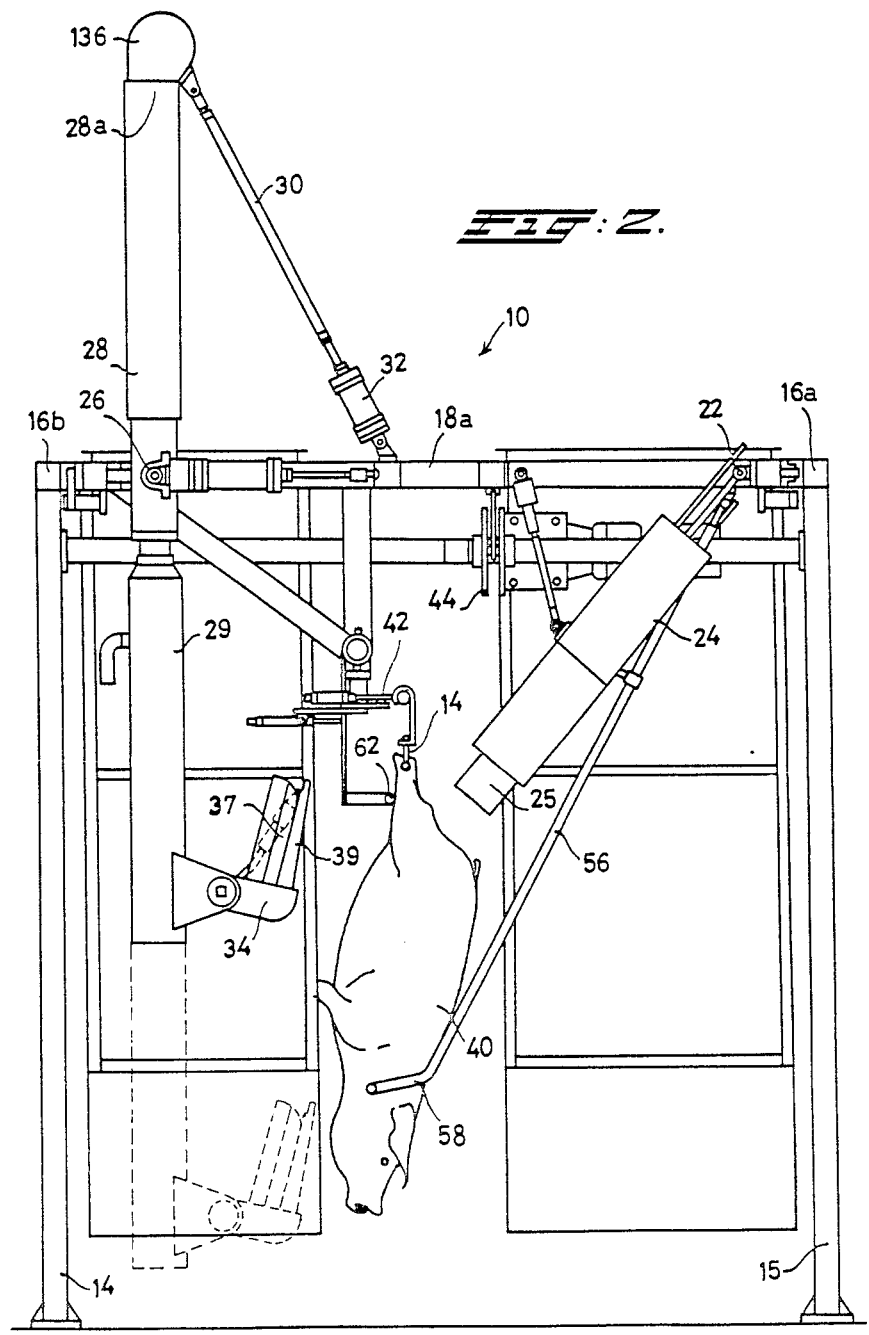

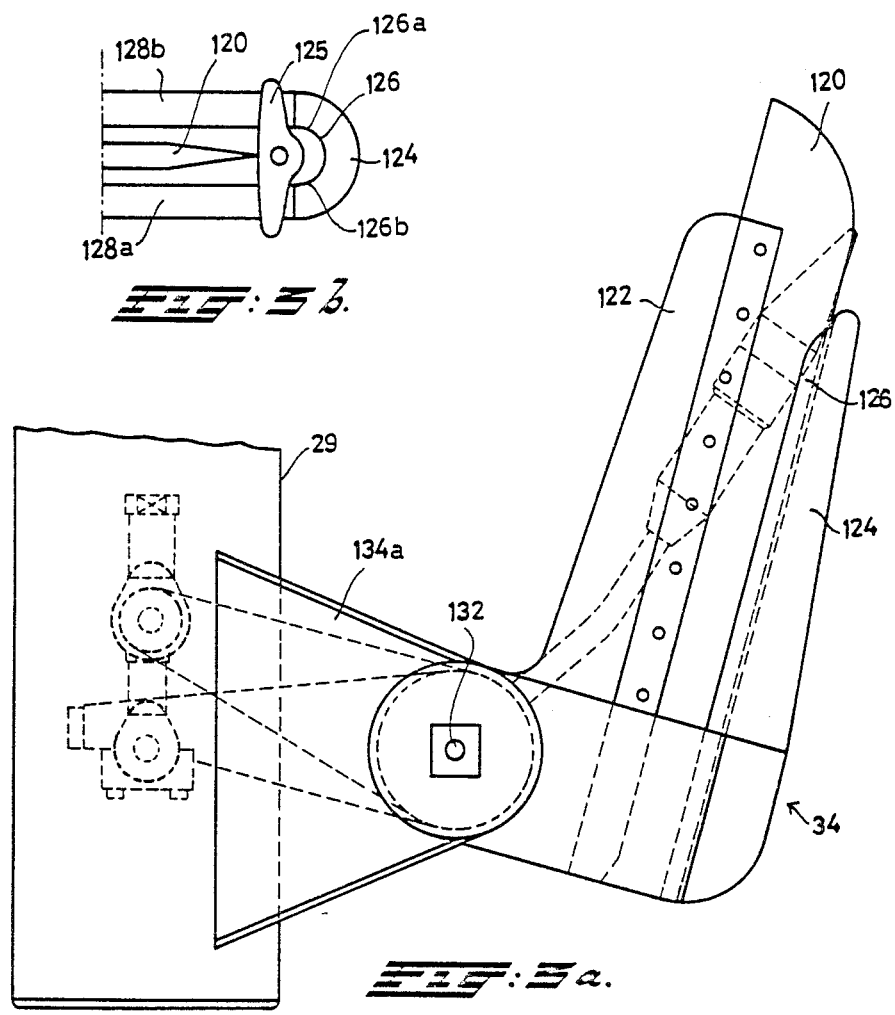

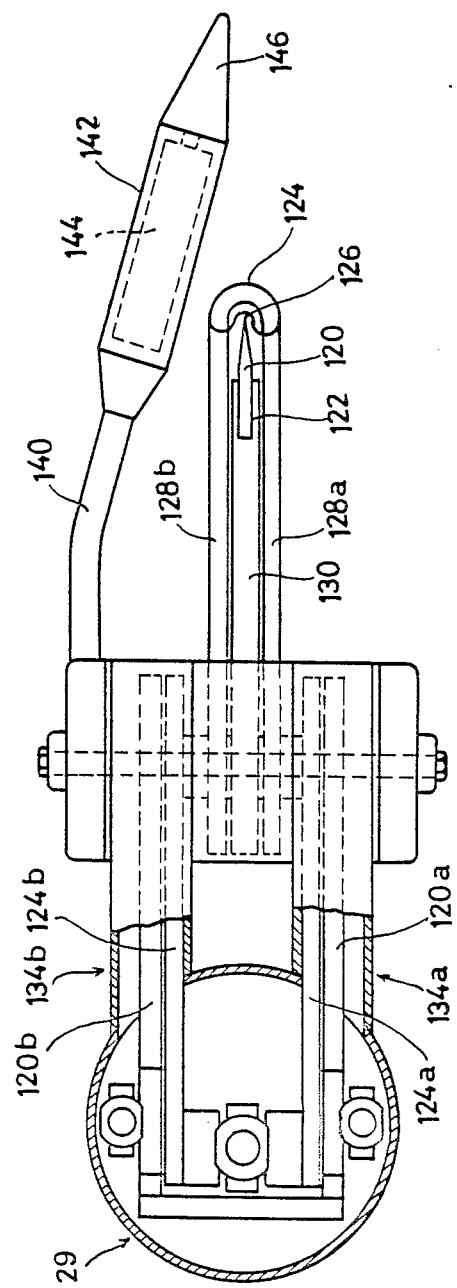

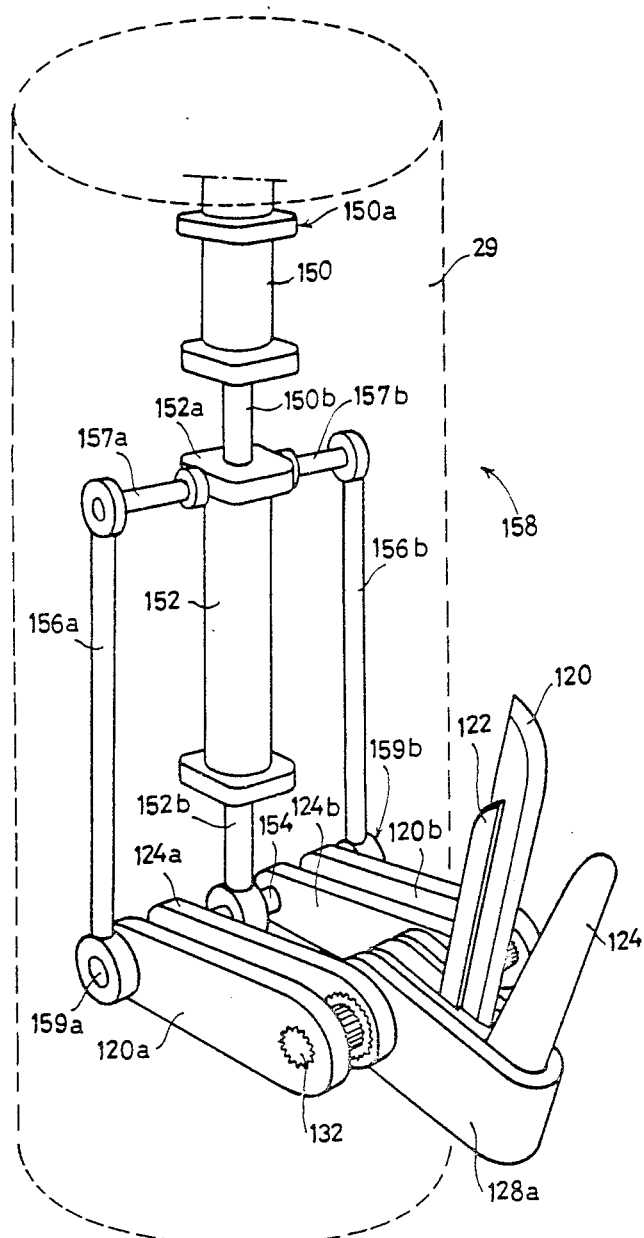

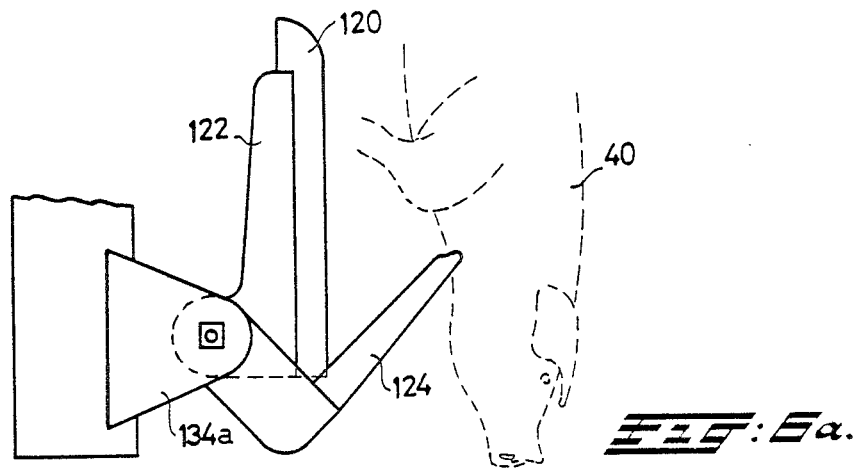
FIG: 6a.
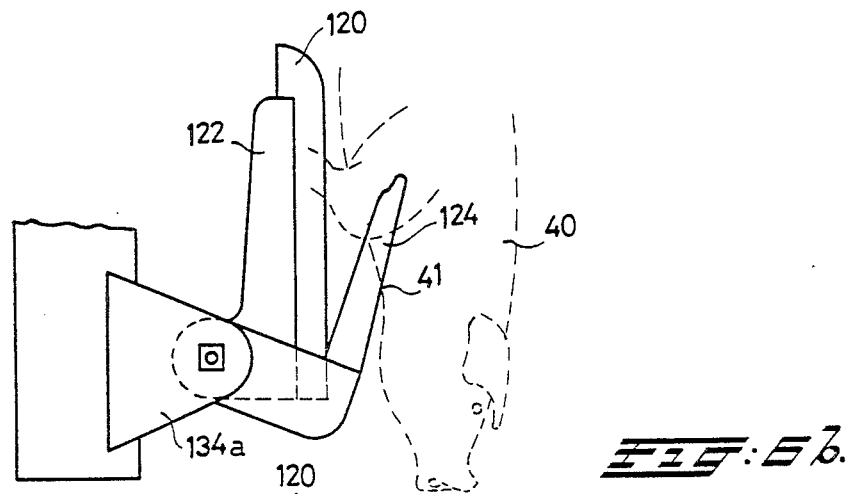
FIG: 6b.
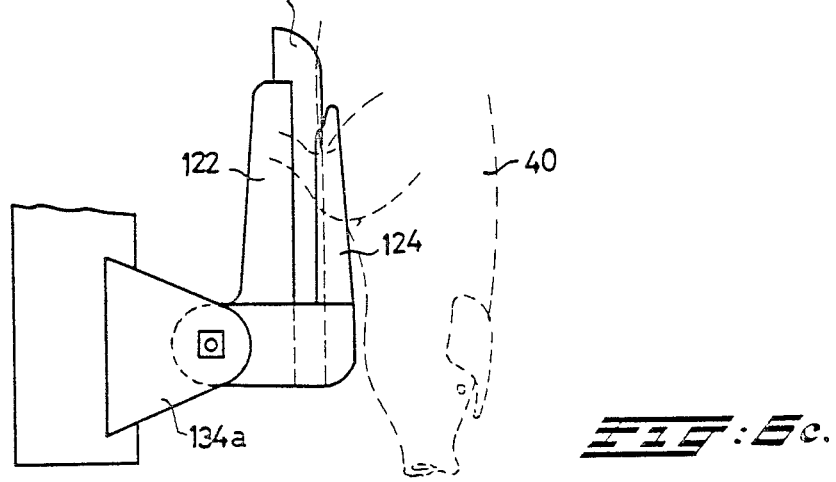
FIG: 6c.

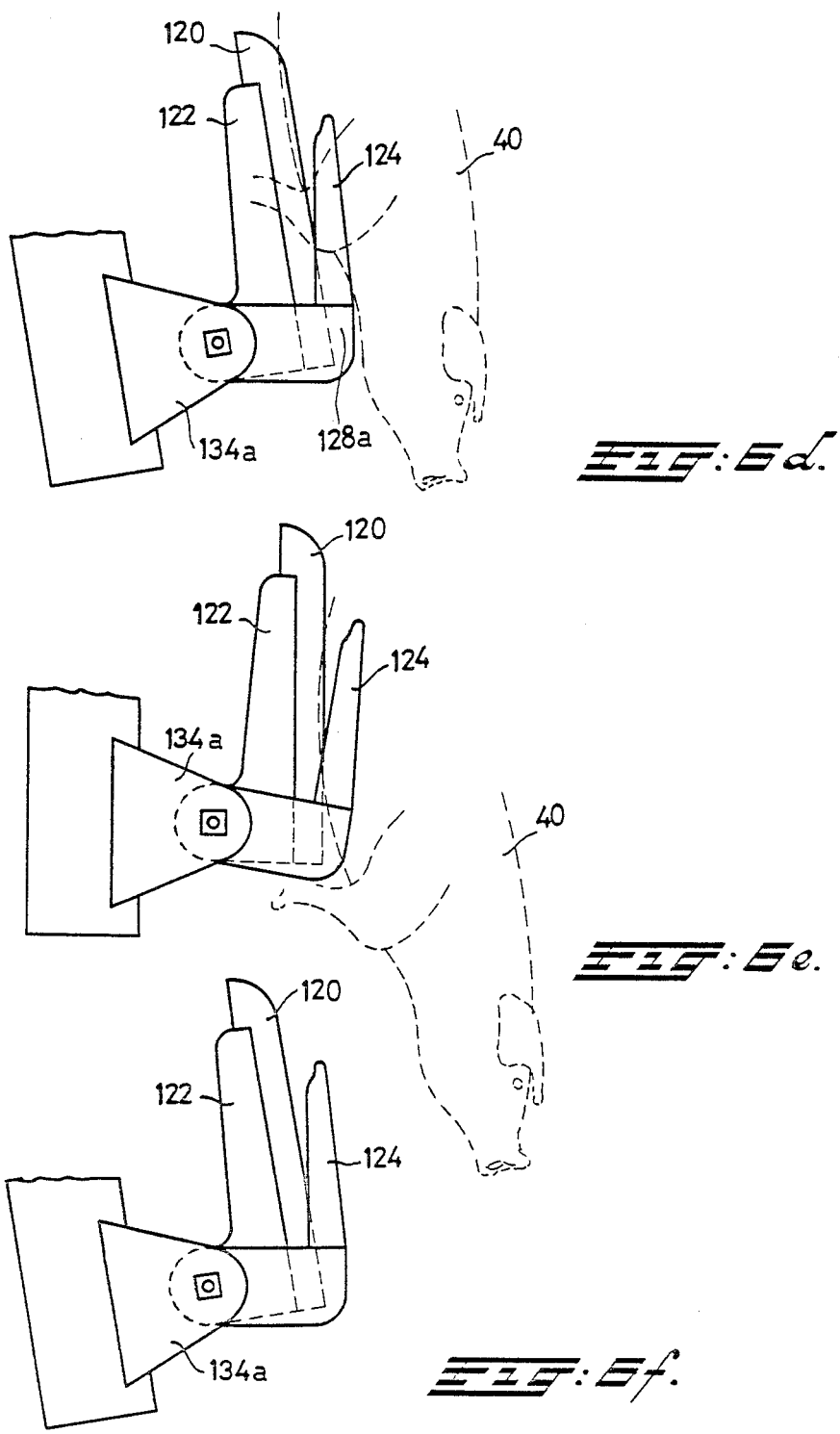

DEVICE FOR CUTTING UP MEAT AND/OR BONES OF A SLAUGHTER ANIMAL

BACKGROUND OF THE INVENTION

This invention relates to a device for cutting up meat and/or bones of a slaughter animal, with a cutting element provided with a cutting edge and a counter support which is situated opposite the cutting edge of said cutting element and comprises an oblong, central, recessed space for receiving the cutting edge.

DESCRIPTION OF THE PRIOR ART

Such a device is known from U.S. Pat. No. 2,237,203. This known device is intended cutting through the backbone of the fowl or for cutting up a fowl in two halves; in both these cases the soft parts of the fowl rest against the counter support of which the recessed space comprises one upstanding first edge, parallel to the plane of the slim cutting blade, and a second edge placed at an obtuse angle thereto.

SUMMARY OF THE INVENTION

The aim of the invention is to provide a device of the kind as described above which is suitable for cutting up thick meat parts and/or bones of a slaughter animal.

Up till now this is carried out by means of a shears element dimensioned according to the measurements of the slaughter animal. This has the disadvantage that, as a result of the cutting edges of the shears sliding past each other on the meat or bone part to be divided up, a tilting moment which has to be absorbed by supporting and positioning elements is exerted, and this means that in practice it is often difficult or impossible to carry out the cutting up according to a particular pattern. It is, however, clear that the device as known from U.S. Pat. No. 2,237,203 is also unsuitable for this purpose.

These disadvantages are eliminated in that, according to the invention, the receiving space is provided with symmetrical bearing faces alongside this space. These give a symmetrical support of the meat or bone parts to be cut up, while centering is also achieved.

Through these measures, symmetrical forces are exerted on the part to be cut up, and there is no longer any tilting moment. Consequently, the supporting and positioning device can be made considerably lighter and simpler, and a more accurate cut is possible.

If the device is particularly or also intended for cutting up bones such as breastbone and/or backbone, according to the invention the cross sectional profile of the recessed area is adapted to the shape of the bones to be divided up. In this way, excellent centering thereof relative to the cutting edge is achieved.

A particular application of the device according to the invention is cutting up of breast and belly of a carcass. According to the invention, in this device the outer support is designed as a mandrel provided with a central groove, while the cutting element is designed as a cutting blade lying opposite it, and adjustable in angular position relative thereto.

Preferably the mandrel is fastened to the end of a first tilting arm, rotatable about a fixed shaft, and the cutting blade is fixed to the end of a second tilting arm independently rotatable about the same shaft. The second end of one of the tilting arms can be connected to one end of an expansion element such as an actuating cylinder and the second end of the other tilting arm being fixed to the other end of said expansion element, and the expansion element being displaceable in the lengthwise direction relative to the fixed shaft.

Preferably the device comprises a pressure bar which is rotatable about the shaft against spring tension, faces the knife, crosses the plane thereof, and has on one end a rotary-driven pressure element which is designed as a rotary element.

DESCRIPTION OF THE DRAWINGS

FIG. 2 is a schematic side view of this installation.

FIG. 3a is a side view of the cutting device according to the invention used in this installation.

FIG. 3b is a section through part of the cutting knife and the counter support, in particular for cutting up bones.

FIG. 4 is a partial top view and partial section of this cutting device.

FIG. 5 is a perspective, schematic drawing of the drive of the parts of the cutting device.

FIGS. 6a–6f show schematically the various phases of the cutting operation.

DESCRIPTION OF A PREFERRED EMBODIMENT

Figure 1:
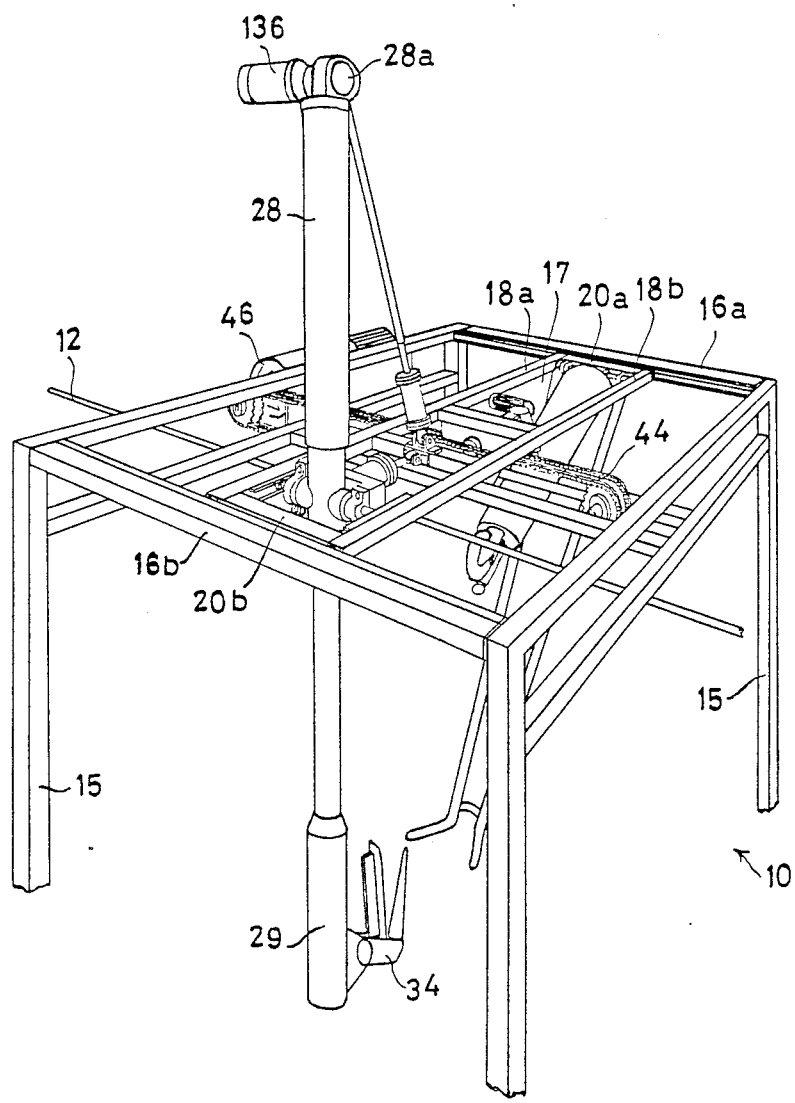
FIG. 1 is a perspective drawing of an installation in which the invention is used.

The installation, indicated in its entirety in FIGS. 1 and 2 by reference number 10, is intended for placing alongside a conveyor track 12, along which the slaughter animals are conveyed in, each hanging from a slaughter yoke 14, which is known per se. The installation consists of a frame which has vertical posts 15 and horizontal connecting parts 16, which can enclose the conveyor track.

Movable between the horizontal bars 16a, 16b is an auxiliary frame 17, comprising longitudinal bars 18a, 18b and the connecting crossbars 20a, 20b. This auxiliary frame 17 bears at one end, pivoting about a horizontal shaft 22, a cylindrical carrier 24 which with drive units (not shown) for a schematically indicated cutting unit 25, which is designed to cut through the hams and the pubis, is not a subject of this application and will therefore not be discussed further, and has at the other end, pivoting about the horizontal shaft 26, a vertical cylindrical carrier 28, which at the top end 28a is connected by means of the connecting bar 30 and the hydraulic cylinder 32 to the auxiliary frame 17. The angular position of the unit 28 is adjustable in the vertical plane by means of this cylinder 32. Projecting at the bottom side from this carrier 28 is the cylindrical housing 29, which by means of a hoisting device, driven by the motor 136 at the top end of the carrier 28, can be moved up and down; this housing 29 bears at the other end a cutting device 34, which is intended for cleaving the breastbone from the so-called sticking hole and making a cut through breast and belly. This device will be discussed in detail below.

As said above, the carcass 40 to be processed hangs from the usual slaughter yoke 14, driven by the conveyor track, and by means of a suitable carrier 42 the auxiliary frame 17 is taken along by this conveyor track over part of the track of the carcass 40 in the direction of movement thereof; during this movement, the various operations on the carcass to be described below are carried out, and when these have been completed and the cutting elements are free of the carcass 40, the auxiliary frame 17 is returned by means of the drive chains 44, driven by the drive motor 46, to the initial position shown on the left in FIG. 1. In a practical embodiment the entire cycle time for processing takes around 12 seconds.

The cutting device 34 shown in detail in FIG. 3a comprises two main parts: the cutting blade 120, which is fixed in the holder 122 and the counter support 124 cooperating therewith, and provided with a central groove 126 into which fits the cutting edge of the cutting blade. At each side of said central groove there is a bearing face, 126a and 126b respectively; said bearing faces being symmetrical with respect to the central groove 126. This counter support 124 will be called the "mandrel" below.

This mandrel 124 is fixed (see FIG. 4) to the end of two arms 128a, 128b, the manner of driving of which is explained in greater detail below; between these arms 128a, 128b is the central arm 130, having at the end thereof the holder 122 and the cutting blade 120. The drive of this arm 130 will also be described further.

It is pointed out that the design proposed according to the invention, with the mandrel provided with a central groove as outer support for a cutting knife, has considerable advantages compared with the usual cutting devices, since in cutting according to the invention no tilting moment is exerted on the part in question—which is the case with ordinary cutting—with the result that the operation can be carried out with much greater accuracy. Besides, centering of the bone or meat to be cut up is obtained, which is of great benefit in practice.

This centering can be seen clearly in FIG. 3b, which shows how the cross sectional profile of the groove 126 is adapted to the shape of the bone 125 accommodated therein—for example, a breastbone or vertebral column.

The three arms mentioned can pivot jointly about the pivot pin 132, and the whole unit is held between two hollow flanges 134a, 134b, which are fastened to the bottom end of the housing 29. As stated, this housing 29 can be moved up and down by means of the drive motor 136, which is located at the top end of the cylindrical carrier 28.

Disposed at the side of the flange 134a is a bent push bar 140, which is rotatable over a limited angle against spring pressure and has at the end a cylindrical housing 142, in which there is a schematically shown drive motor 144 for the circular tapering pressure element 146. The motor 144 is preferably a pneumatic motor—such drive motors are known per se.

The function and operation of the pressure element will be explained further below.

The drive of the mandrel 124 and the knife 120 is ensured by means of two pneumatic or hydraulic working cylinders, accommodated in the housing 29. The design is schematically shown in FIG. 5. Supported around the central shaft 132, which is fixed by its ends to the housing 29, are a number of arms, in such a way that by means of a shaft and sleeve coupling, which need not be described in detail, the two arms 128a, 128b—the free end of which bears the mandrel 124—are connected to the arms 124a, 124b, so that the movement of these arms 124a, 124b is transmitted to the mandrel 124. The arm 130, which is connected to the knife 120, is connected to the two arms 120a, 120b, so that the movement of the arm 120a, 120b is transmitted to the knife 120.

The various movements are obtained with a first working cylinder 150 and a second working cylinder 152. The cylinder 150a of the working cylinder 150 is fixed to the housing 29, and the piston rod 150b thereof is connected to the top end 152a of the cylinder 152, the piston rod 152b of which is connected to the shaft 154, which connects the two arms 124a and 124b. The top end of the bars 156a, 156b is hingedly linked by means of the bars 157a, 157b to the top end 152a of the cylinder 152, while the bottom end of each of the bars is linked by means of the hinge connection 159a, 159b to the free ends of the arms 120a, 120b. With this construction is obtained that during expansion of the cylinder 150, knife 120 and mandrel 124 will move together in the direction of the arrow 158; on retraction of the cylinder 150, the opposite, of course, takes place. The cylinder 152 controls the movement of knife 120 and mandrel 124 relative to each other.

How the various movements take place will now be explained below. The various movements and the course of the movements are controlled by a number of sensors and control elements now shown, the realization of which is within the scope of the expert.

FIG. 6a shows the initial position. In this position the whole cutting unit 34 is in the low position, the exact distance of which from the slaughter line 24, and thus relative to the carcass 40, depending of course on the size of said carcass 40; this size is determined by a sensor set up along the slaughter line and not shown, for example a run-on surface connected to a signal transmitter which gives a signal which depends on the length of the carcass. Depending on this length, the correct initial position of the cutting device 34 is set.

In this initial position shown in FIG. 6, both the cylinders 150 and 152 are retracted.

FIG. 6b shows the position in which the mandrel 124 penetrates through the earlier formed sticking hole 41 into the carcass 40. This is in fact a composite movement, produced by the cylinder 150 remaining retracted and the cylinder 152 expanding, while the housing 29 is raised. After that, the breastbone is cleaved, by the mandrel 124 being pressed towards the knife 120, and knife 120 in the end reaching the position shown in FIG. 6c: in this position cylinder 150 is retracted and cylinder 152 is fully expanded. During this cleaving, no tilting moment is exerted on the carcass 40, unlike the known device with a cutting knife, so that said carcass remains hanging motionless and centered.

The next phase is the opening of the carcass. This is initiated from the position shown in FIG. 6d. The cylinder 150 is expanded, and the cylinder 152 retracted slightly; the mandrel returns to the position shown in FIG. 3, while the knife tilts back. The whole unit is now ready for the start of the upward-directed cutting movement.

The pneumatic motor 144 is started, causing the pressure element 146 to be rotated. The function thereof is to prevent the penis of the carcass of a male animal from being cut through: the penis is pushed aside by the rotating pressure element 146 during the upward movement of the cutting device 134.

During this upward movement, with constant slight pressure of the cutting unit against the carcass 40, following the belly line—which takes place under the control of the pneumatic cylinder 32, which by means of the connecting bar 30 determines the angular position of the carrier 28 with the housing 29—the cylinder 150 is slowly retracted. So, in the end, the top position shown in FIG. 6e is reached.

In this top position the cutting unit has arrived at the cut which has in the meantime been made by the cutting element 25, and the processing is therewith actually complete. During this movement the cylinder 150 is retracted slowly.

By again expanding the cylinder 150, the whole unit tilts forward, the carrier 28a is tilted away from the carcass by the cylinder 32, and the lifting motor 136 draws up the unit to the top position. Thereafter, the whole unit is returned to the end position and is cleaned by a spraying device (not shown), following which the plant is ready for carrying out a new operation.

What is claimed is:

1. Apparatus for dividing carcasses of hogs or other big slaughter animals comprising a cutting element provided with a cutting edge and a counter support situated opposite the cutting edge of said cutting element, said counter support having an oblong, central, recessed space for receiving the cutting edge, with symmetrical bearing faces alongside this space, said cutting element being adjustable in angular position with respect to the counter support, the counter support further comprising a mandrel provided with a central groove, the cutting element further comprising a cutting blade lying opposite the counter support.

2. Apparatus according to claim 1, in which the mandrel is fastened to the end of a first tilting arm, rotatable about a fixed shaft and the cutting blade is fixed to the end of a second tilting arm, independently rotatable about the same shaft.

3. Apparatus according to claim 2, in which the second end of one of the tilting arms is connected to one end of an actuating expansion cylinder, and the second end of the other tilting arm is fixed to the other end of said expansion cylinder, and wherein the expansion cylinder is displaceable in lengthwise direction, relative to the fixed shaft.

4. Apparatus according to claim 2, including a bar which is hingedly supported by said fixed shaft, said bar mounting tiltable first and second tilting arms each of which is under spring tension; a free end of said bar being bent towards the plane of the knife, whereby it lies in front of said knife, while the other end of said bar terminates in a cylindrical housing for a drive motor, said motor rotateably driving a pointed conical pressure element, the point of which is directed outwardly, a base of the conical pressure element merging in an outer circumference of the housing.

* * * * *